(12) United States Patent  
Miller et al.

(10) Patent No.: US 6,508,901 B2
(45) Date of Patent: Jan. 21, 2003

(54) THERMO-ENCAPSULATING SYSTEM AND METHOD

(75) Inventors: Robert D. Miller, Lancaster, NY (US); Raymond S. Konopa, Alden, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 69 days.

(21) Appl. No.: 09/810,299

(22) Filed: Mar. 16, 2001

(65) Prior Publication Data

US 2002/0129905 A1 Sep. 19, 2002

(51) Int. Cl.$^7$ .......................... B32B 31/00; B30B 15/02
(52) U.S. Cl. ...................... 156/227; 156/251; 156/252; 156/515; 156/581; 156/583.4
(58) Field of Search ................. 156/251, 252, 156/264, 515, 517, 518, 212, 216, 217, 228, 580, 581, 583.1, 583.4, 227

(56) References Cited

U.S. PATENT DOCUMENTS

| | | | |
|---|---|---|---|
| 2,710,046 A | 6/1955 | Markus et al. ............... 154/125 |
| 2,941,575 A | 6/1960 | Malmberg et al. ............ 154/42 |
| 2,976,199 A | * 3/1961 | Rand ......................... 156/163 |
| 3,205,114 A | 9/1965 | Gross ......................... 156/380 |
| 3,226,527 A | 12/1965 | Harding ...................... 219/384 |
| 3,347,733 A | 10/1967 | Elver ......................... 156/515 |
| 3,466,214 A | 9/1969 | Polk et al. ................... 156/213 |
| 3,536,568 A | 10/1970 | Rothstein .................... 156/515 |
| 3,562,066 A | 2/1971 | St. Denny .................... 156/515 |
| 3,577,820 A | 5/1971 | Silverstein ................... 83/171 |
| 3,614,383 A | 10/1971 | Watts, Jr. ..................... 219/243 |
| 3,953,280 A | 4/1976 | Brophy et al. ................ 156/515 |
| 3,982,991 A | 9/1976 | Hamm et al. ................. 156/515 |
| 4,055,456 A | 10/1977 | Carnegie, Jr. ................ 156/366 |
| 4,158,762 A | 6/1979 | Saunders ..................... 219/121 L |
| 4,268,338 A | 5/1981 | Peterson ...................... 156/251 |
| 4,297,559 A | 10/1981 | Whitman, III ............... 219/121 LB |
| 4,568,815 A | 2/1986 | Kimbara et al. ............. 219/121 LK |
| 4,847,462 A | 7/1989 | Soodak et al. ............... 219/121.63 |
| 4,874,919 A | 10/1989 | Bransden et al. ............ 219/121.68 |
| 4,981,546 A | 1/1991 | Bergevin ..................... 156/515 |
| 4,999,081 A | 3/1991 | Buchanan .................... 156/515 |
| 5,028,294 A | 7/1991 | England ...................... 156/515 |
| 5,213,649 A | 5/1993 | Sepavich et al. ............. 156/380.7 |
| 5,370,760 A | 12/1994 | Mori et al. ................... 156/89 |
| 5,760,369 A | 6/1998 | Wenkman ................... 219/121.71 |
| 6,103,040 A | * 8/2000 | Hunkeler .................... 156/226 |

* cited by examiner

*Primary Examiner*—Mark A. Osele
(74) *Attorney, Agent, or Firm*—Michael F. Scalise (57) ABSTRACT

A system and method for cutting and heat sealing polypropylene film and/or other separator material around individually shaped cathode, anode or other active components, for use in a battery or capacitor and/or other implantable medical device.

20 Claims, 7 Drawing Sheets

THERMO-ENCAPSULATING SYSTEM AND METHOD

FIELD OF INVENTION

The present invention pertains generally to a system and method for manufacturing components for implantable medical devices such as batteries or capacitors.

BACKGROUND OF THE INVENTION

Devices for heat sealing thermoplastics are generally known. Examples of heat sealing apparatus are disclosed in the patents described below.

U.S. Pat. No. 4,268,338 to Peterson shows a pressure die 17, preferably of Delrin, having a profiled face 17a that provides a greater amount of pressure at the outer edge 17b of the die. In that manner, the outer edge 17b of the pressure die sinks into the thermoplastic material sheets $P_1$, $P_2$ a distance sufficient to form a parting line while the remaining profiled face 17a applies pressure sufficient to achieve a weld between the two layers of thermoplastic material.

U.S. Pat. No. 5,028,294 to England relates to a for heat welding a plastic motif to a textile base and comprising a welding ledge 12b and a cutting edge 14, best shown in FIG. 5.

U.S. Pat. No. 3,577,820 to Silverstein pertains to a die for sealing or cutting thermoplastic material. Heated die 45 is machined from ribbon or bar stock of a material such as nichrome and inlaid in a groove 30 formed in a rigid plate 20 of insulated material. FIGS. 13 and 14 illustrate dies having a longitudinally extended rib 48 in the form of a raised portion.

U.S. Pat. No. 4,055,456 to Carnegie, Jr. pertains to an impulse heat-sealing machine having an etched metal foil heater element 127 having a TEFLON® non-stick layer provided thereon. The heater element serves to seal two thermoplastic sheets together at a seam while a proximate knife blade 122 severs the joined sheets from the stock material.

U.S. Pat. No. 3,614,383 to Watts, Jr. pertains to an apparatus for cutting and/or sealing plastic film, and includes an impulse-heated cutting device and a pressure pad provided on opposite sides of the film. The cutting device includes a support frame member and a resistance-heated element formed by a corrugated ribbon supported in the frame by a dielectric material. An edge of the resistance ribbon projects from the support frame towards a pressure pad 73 for cutting and/or sealing a film sheet when the film is compressed between the pressure pad and the resistance element.

The problem with the prior art is that while it describes various heat sealing apparatus, the material to be heat sealed is not precisely cut to form. This can lead to waste with sealed envelopes of too little or too much material being used. In the former case, the envelope can be easily compromised, while the latter situation can lead to an improper fit as the excess material takes up space intended for other components. This is especially the case in electrochemical cells.

What is needed is a system, for precisely cutting and sealing separator materials around electrode assemblies, that is reliable, economical and user friendly.

SUMMARY OF THE INVENTION

The present invention meets the above-described need by providing a system and method for cutting and heat sealing polypropylene film and/or other separator material around individually shaped cathode, anode or other active components, for use in a battery or capacitor and/or other implantable medical device.

The system includes a laser material cutting and perforating mechanism and a thermo-sealing apparatus.

The laser cutting and perforating system provides for cutting guide holes and other openings in the separator with a high degree of accuracy. The guide holes in the separator are used to position the separator in the thermo-sealing apparatus for sealing.

The thermo-sealing apparatus includes a fixture base that provides a mounting surface for a dielectric platform, acts as a heat sink, and provides a mounting surface for the necessary electrical connections.

The dielectric platform acts as a precision track for retaining a heating element during repeated heating and cooling cycles. The dielectric platform also acts as an insulator during the sealing process.

The track on the dielectric platform receives a heating element. The heating element is the portion of the fixture that does the actual cutting and sealing of the film. The geometry of the element is important to the process. The element is machined in two thicknesses. The raised or thicker portion provides the precise cutting dimension while the lower or thinner area provides a precision seal width. The element is chemically or mechanically machined on a thin metallic plate. The element design is unique to each individual sealing operation in size and shape.

The lower platen of the thermo-sealing apparatus includes the dielectric material and the heating element. The dielectric material has a pair of openings for a set of retractable pins that provide for precise positioning of the cathode or anode assembly being sealed. The pins are retractable such that the assemblies can be removed from the device after sealing without damaging the assembly. Also, the pins can be retracted for storage. The lower platen also includes a set of locating pins for positioning the separator material.

The upper platen includes a vulcanized, molded silicone rubber pad. The silicone rubber acts as a pressure pad for sealing.

Both the upper and lower platens are covered with a pressure-sensitive adhesive tape to provide an insulating layer between the heating element and the rubber pad.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
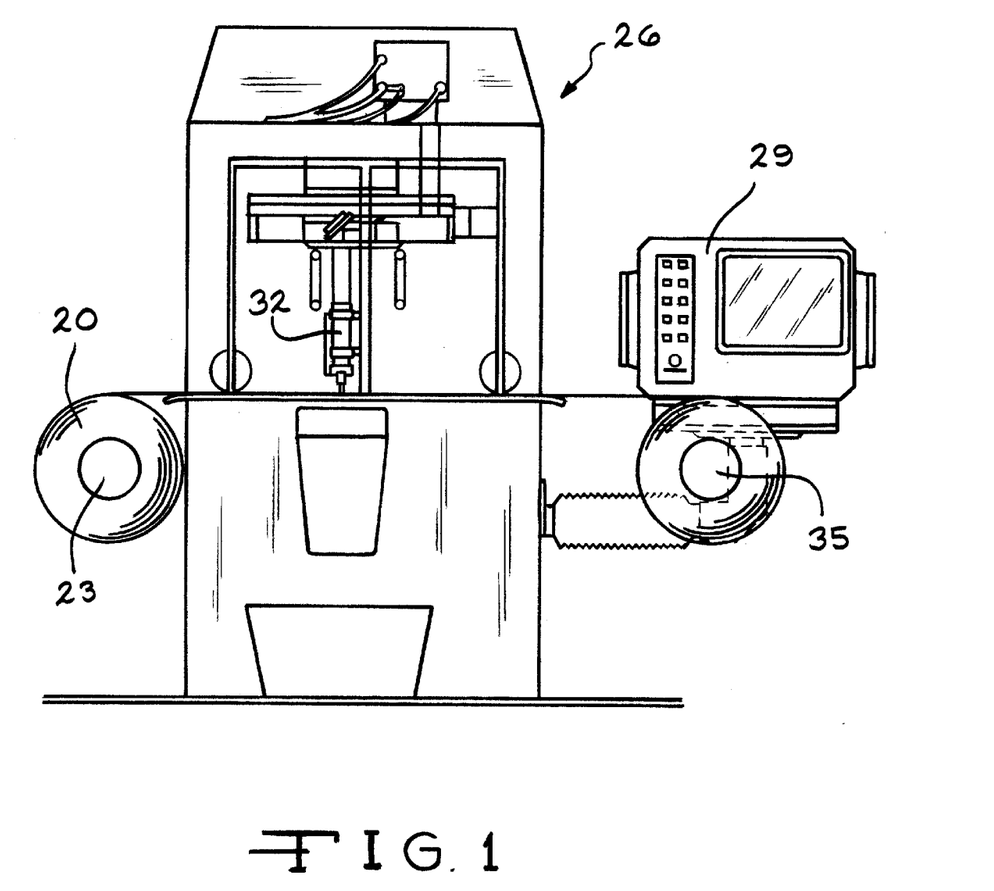
FIG. 1 is a front elevational view of the material cutting and perforating mechanism.

Referring to FIGS. 1–12 and initially to FIG. 1, a continuous web of separator material 20 is stored on a film reel 23. The separator material 20 may comprise polypropylene or other material suitable for use as a separator material for an electrode assembly. As known to those of ordinary skill in the art, for a battery having anode and cathode electrodes, the separator material is disposed between the anode and cathode materials to prevent contact between the active electrode materials to prevent a short circuit from occurring.

The material 20 from reel 23 is fed into a cutting system 26. The cutting system 26 is preferably a $CO_2$ laser galvanometer beam scanner system. A central processing unit 29 having a PLC controlled encoder is used to control the cutting device 32. The system 26 also includes a reel to reel polypropylene material conveyor system that conveys the film from the supply reel 23 to a take-up reel 35 disposed on the opposite side of the system 26. The material on the take-up reel 35 is capable of being separated into individual sheets for the sealing process described below. The laser cutting system 26 has the ability to mechanically position and accurately perforate the insulating material with a precise pattern of holes and slots that are unique to the individual design of the component being sealed and are used as locating features in subsequent operations.

Figure 2:
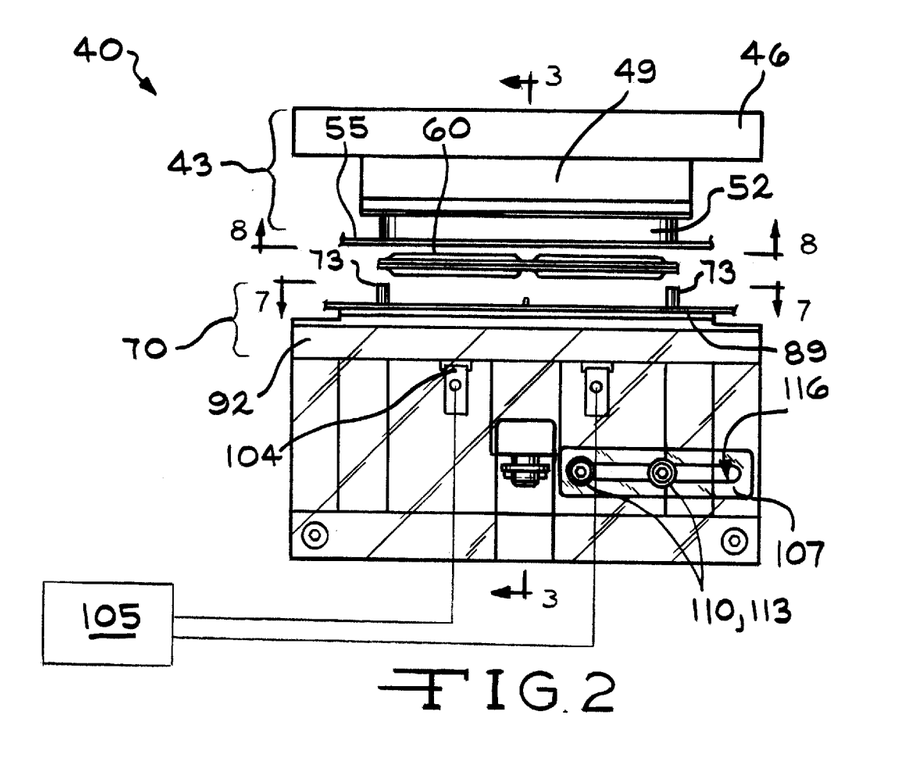
FIG. 2 is a front elevational view of the thermo-encapsulating device of the present invention with an electrode assembly disposed therein.

In FIG. 2, the heat sealing fixture 40 of the present invention includes an upper platen 43 that includes a first aluminum block 46, a second aluminum block 49, and a molded silicone rubber pad 52 serving as a die. The molded silicone rubber may comprise silicone rubber having a durometer between 50 and 70. Other materials and hardnesses may also be suitable. The silicone rubber acts as a pressure pad and is precisely positioned over the heating element in the lower platen. The shape of the die 52 will be described in greater detail below.

The die 52 is covered by a pressure-sensitive adhesive tape 55 to provide protection from the heat associated with the heating element. The pressure-sensitive tape may comprise KAPTON TEMP-R-TAPE brand model number K250 protection tape. This protection tape is available from CHR Industries in New Haven, Conn. Other tapes having similar properties to this tape may also be suitable.

An electrode assembly 60 (shown in FIG. 11 with the active material removed for clarity) sealed between two layers of separator material 20 is illustrated in its position between the upper and lower platens 43, 70. The electrode assembly 60 includes a screen 63 having active material pressed thereto. The active material is disposed on both sides of the screen 63. The separator material 20 is heat sealed around the electrode assembly 60 as described in greater detail below.

The lower platen 70 includes a set of locating pins 73 for positioning the separator material. The laser cutting system 26 provides the separator material 20 with corresponding openings for receiving the pins 73 to accurately position the separator 20 for sealing. The lower platen 70 also includes a pair of retractable pins 77 (best shown in FIG. 5) having a very small diameter, for example, twenty-thousandths of an inch in some applications. At least one of the retractable pins 77 engages with an opening 80 (FIG. 11) in a tab 83 (FIG. 11) disposed between two sections of the screen 63. The retractable pins 77 are spring-biased in the position shown in FIG. 5. By operation of a pivoting lever 86, the pins 77 may be retracted so that the sealed electrode assembly can be removed from the fixture 40 without the risk of damage from the pins 77. The retracting mechanism is described in greater detail below.

The lower platen 70 is comprised of a dielectric material 89 mounted to an aluminum plate 92 that acts as a heat sink. The dielectric material 89 may comprise a machinable glass ceramic material. One suitable material is MACOR brand glass ceramic material available from Corning, Inc. in Corning, N.Y. The material has a precision track 95 (FIG. 7) defined therein for holding the heating element 98 in position (best shown in FIG. 4). The track 95 retains the heating element 98 during repeated heating and cooling cycles, and also acts as an insulator during the sealing process.

The lower platen 70 is also covered by the pressure-sensitive tape 55 (KAPTON TEMP-R-TAPE brand model number K250 protection tape). Other tapes having similar properties to this tape may also be suitable.

Opposite ends of the heating element 98 (FIG. 7) extend downward through openings 101 in the dielectric plate 89 and terminate in a pair of copper terminals 104 that provide a connector between the heating element 98 and the wires from the power source 105. The power source 105 is controlled by a rheostat.

A sliding element 107 provides a means for locking the retractable locating pins 77 in the retracted position for storage. The sliding element 107 is mounted on a set of pins 110, 113 by means of a longitudinal slot 116. The sliding element 107 slides left and right with respect to the orientation of FIG. 2. When the lever 86 is pushed downward and sliding element 107 is slid to the left, the lever 86 is prevented from moving into its spring-biased position and therefore, the pins 77 are held in the retracted position beneath the surface of the dielectric material 89.

Figure 3:
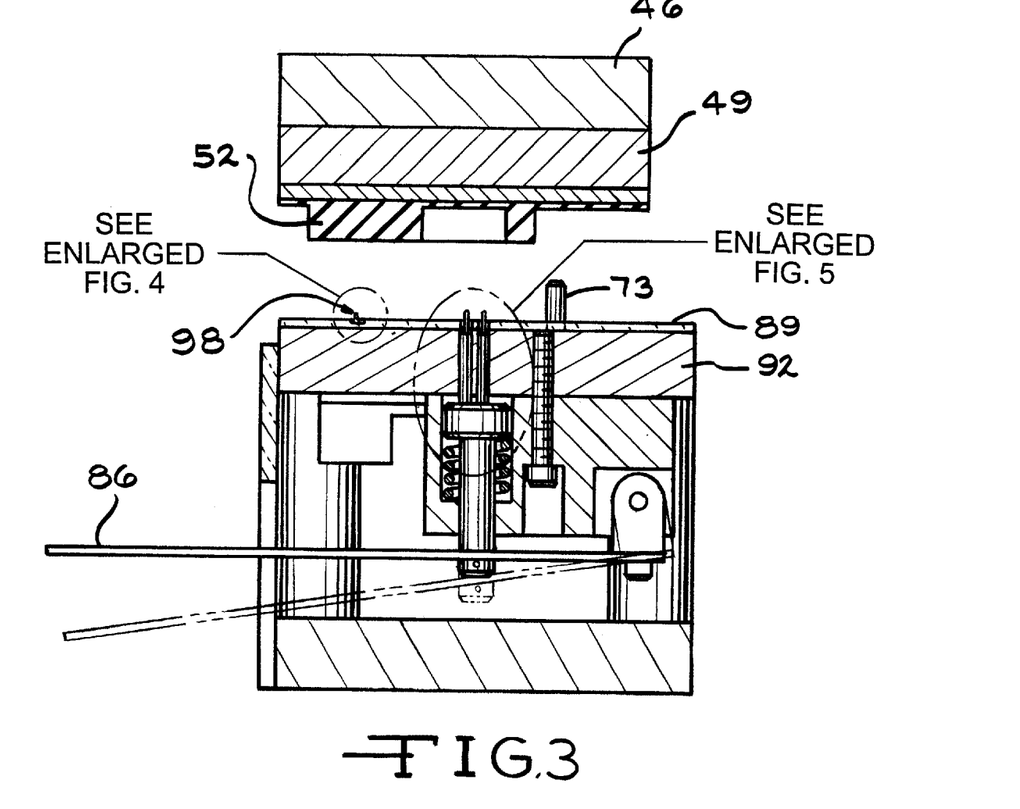
FIG. 3 is a cross-sectional view taken along lines 3—3 of FIG. 2.
Figure 5:
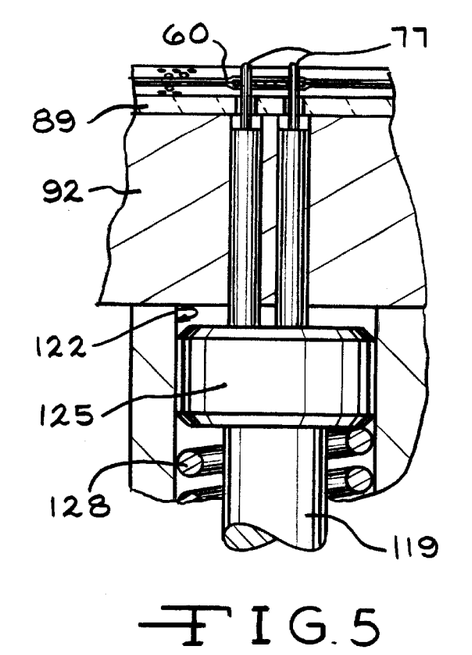
FIG. 5 is a detailed partial cross-sectional view of the retractable locating pins shown in FIG. 3.
Figure 6:
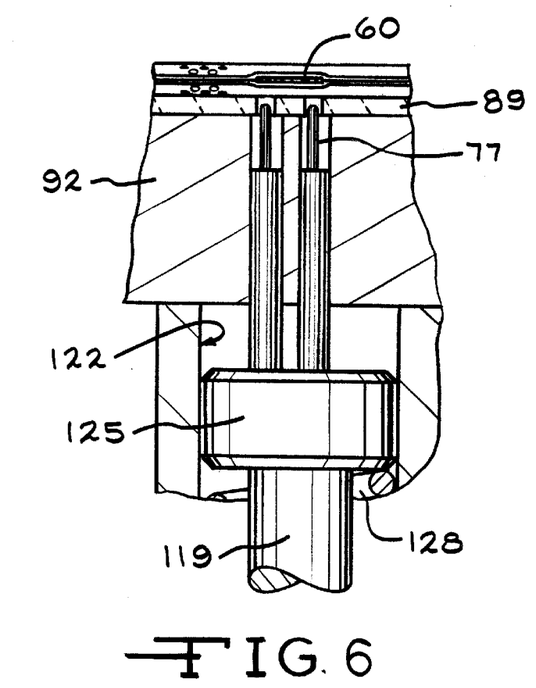
FIG. 6 is a detailed partial cross-sectional view of the locating pins of FIG. 5 in the retracted position.

Turning to FIGS. 3, 5, and 6, the retracting pins 77 are shown in greater detail. The retracting pins 77 are mounted on the end of a shaft 119 that reciprocates in a bore 122 formed in the apparatus. The shaft 119 has a piston 125 designed to travel inside the bore 122. A coil spring 128 is disposed around the shaft 119 inside the bore 122 on the side of the piston 125 opposite the retracting pins 77. The coil spring 128 biases the piston 125 such that the pins 77 are normally extending through the dielectric plate 89. The pivoting lever 86 is attached at one end to a pivot 131 and is also attached to the shaft 119. The opposite end of the lever 86 provides a handle for manually rotating the lever 86 about the pivot point 131. When the lever 86 is rotated downward, as shown in broken lines in the figure, the shaft 119 is pulled downward against the force of the spring 128 and the pins 77 are retracted to prevent damage to the finished assembly as it is being removed from the lower platen 70 after the sealing has taken place.

Figure 4:
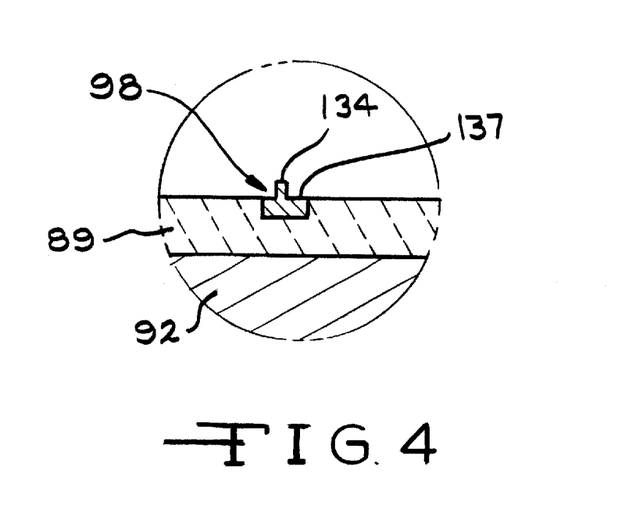
FIG. 4 is a detailed partial cross-sectional view of the heating element of FIG. 3 disposed in the track in the platform.

In FIG. 4, a detailed cross-section of the dielectric material 89 illustrates the precision track 95 and the heating element 98 disposed therein. The heating element 98 (best shown in FIG. 7) is a stainless steel, Ni-chrome or other metallic element that is heated by the power source 105 and that provides the cutting and sealing of the separator material 20 about the electrode assembly 60. The element 98 is chemically or mechanically machined on a thin metallic plate. One embodiment of the heating element 98 is a 303 stainless steel element that is photo-etched on a thin metallic sheet. The element design is unique in size and shape for each individual sealing operation. The element 98 is machined in two thicknesses. The raised or thicker portion 134 provides the precision cutting dimension, while the lower or thinner area 137 provides a precision seal width. In some applications, the raised portion may be 8 to 10 thousandths of an inch wide across the top where it is flat.

Figure 7:
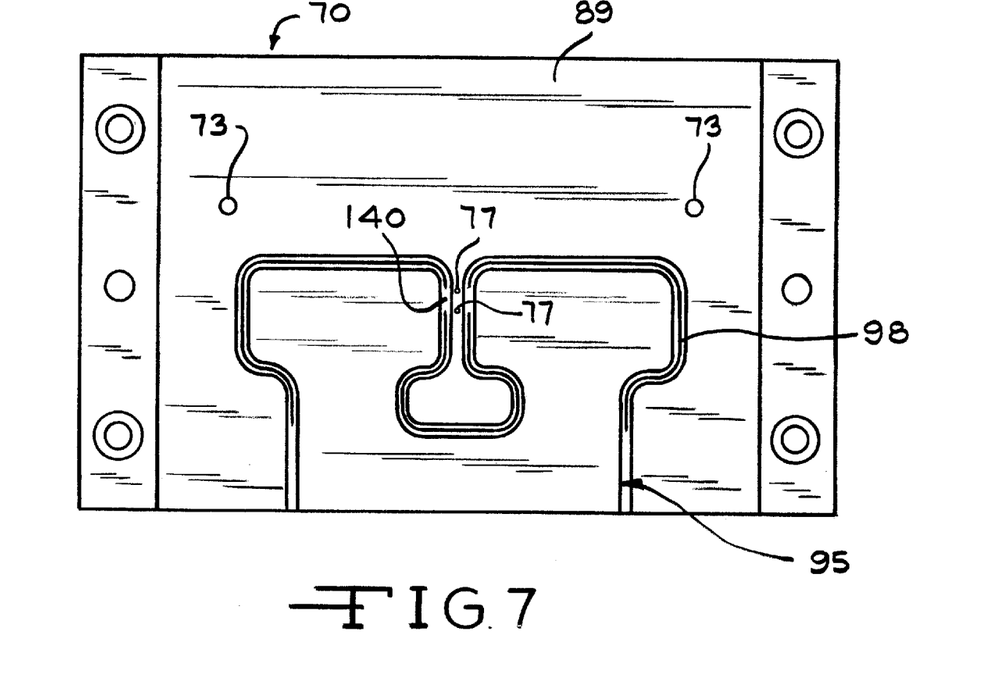
FIG. 7 is a view taken along lines 7—7 of FIG. 2.

In FIG. 7, the lower platen 70 is shown. As shown, the heating element 98 rests in the precision track 95 that is cut into the dielectric plate 89. The heating element 98 is designed for an electrode assembly 60 having two sections of rectangular shaped screen 63 connected by a relatively narrow tab 83. Because the separator material 20 is a single sheet folded over the electrode assembly 60, the heating element 98 only has to seal three sides of the separator material 20. The heating element 98 has a flat portion 140 in it where the raised portion 134 (FIG. 4) is discontinuous. The flat portion 140 corresponds to the tab 83 when the electrode assembly 60 is placed into the fixture 40. The flat portion 140 prevents the separator material 20 from being sealed to the tab 83. The separator material 20 is not completely sealed to the electrode assembly because the tab 83 is the site of a subsequent welding operation. Also, it is preferable to have a short section of the separator material 20 unsealed in order to provide greater flexibility for the separator material 20 to allow for expansion of the intercalated materials.

The larger guiding pins 73 for the folded separator materials 20 are disposed at opposite sides of the lower platen 70. The retractable pins 77 are much smaller and may have a diameter as small as twenty-thousandths.

Figure 8:
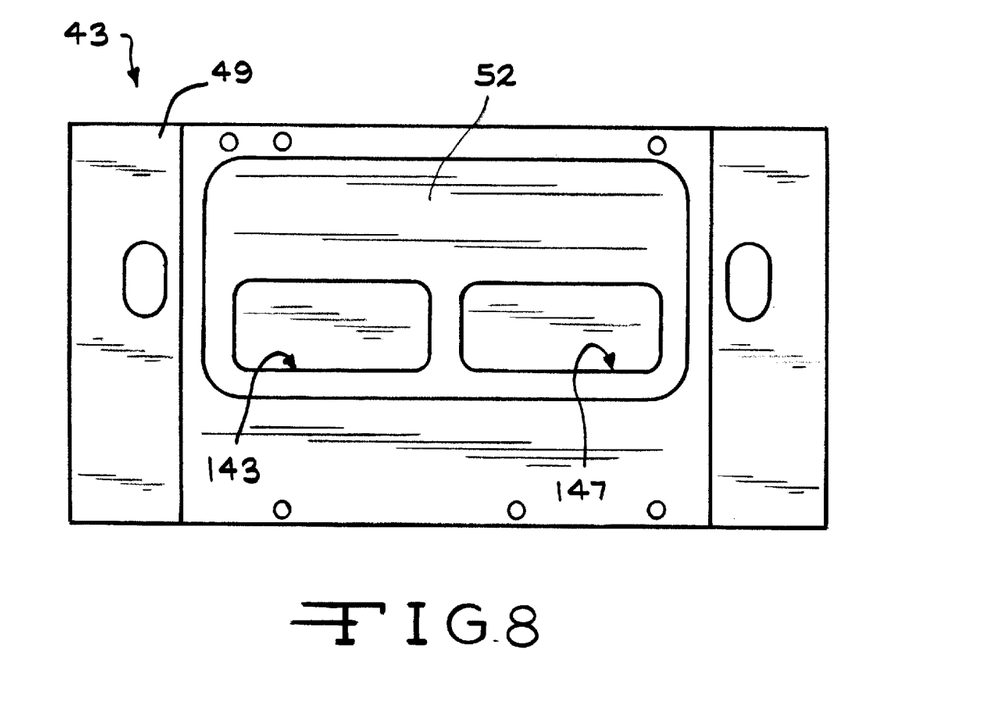
FIG. 8 is a view taken along lines 8—8 of FIG. 2.

Turning to FIG. 8, the vulcanized, molded, silicone rubber pad 52 has a durometer of 50 to 70 and is disposed on the upper platen 43. The rubber pad 52 acts as a pressure pad during the sealing process. The rubber pad 52 has two rectangular openings 143, 147 with rounded edges that correspond to the shape of the electrode assembly 60. The openings 143, 147 are slightly larger than the electrode assembly 60 such that the electrode assembly 60 is received in the openings when pressure is applied to force the upper and lower platens 43, 70 together. The rubber pad 52 applies pressure to the heating element 98 and to the periphery of the electrode assembly 60 to aid in the cutting and sealing of the electrode assembly 60.

Referring to FIG. 4, the separator material 20 that contacts the top portion 134 of the heating element 98 under pressure is vaporized. The separator material 20 that is disposed just inside the top portion 134 of the heating element 98 is pushed down onto the thinner portion 137 of the heating element where it is sealed against the layer of separator material 20 disposed on the other side of the electrode assembly 60.

Figure 9:
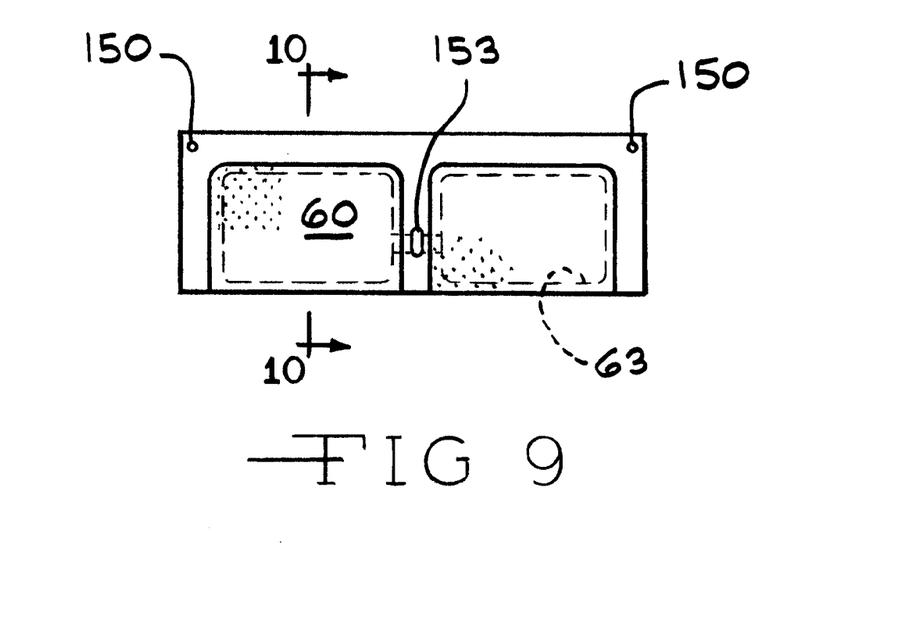
FIG. 9 is a top plan view of the sealed electrode assembly of the present invention after sealing but prior to removal of the skeleton.
Figure 10:
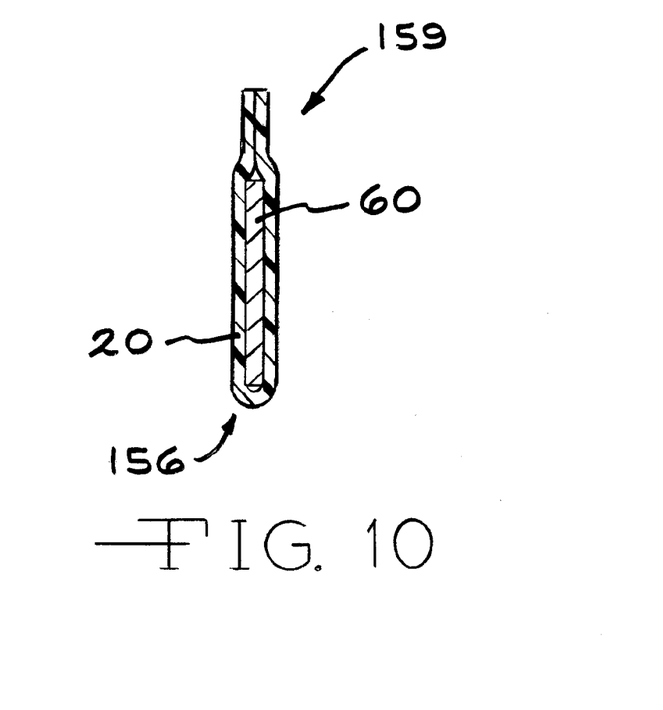
FIG. 10 is a cross-sectional view taken along lines 10—10 of FIG. 9.

In FIG. 9, the locating holes 150 in the separator 20 are shown. Also, the central opening 153 that aligns with the tab 83 that connects the two sections of the electrode assembly 60 is shown. The central opening 153 also provides an opening for positioning the locating hole 80 on the tab 83 of the screen 63 (shown in FIGS. 10 and 11) relative to the retractable pins 77 in the center of the fixture 40. The outline of the screen 63 of the electrode assembly 60 is shown in broken lines. Because the separator material 20 is folded on one side, there are three sides that have to be sealed. Turning to FIG. 10, the separator material 20 is sealed around the electrode assembly 60 but the skeleton (excess material after the separator material 20 has been cut) has not been removed. A first end 156 of the separator material 20 is folded over the electrode assembly 60 and sealed there.

Figure 11:
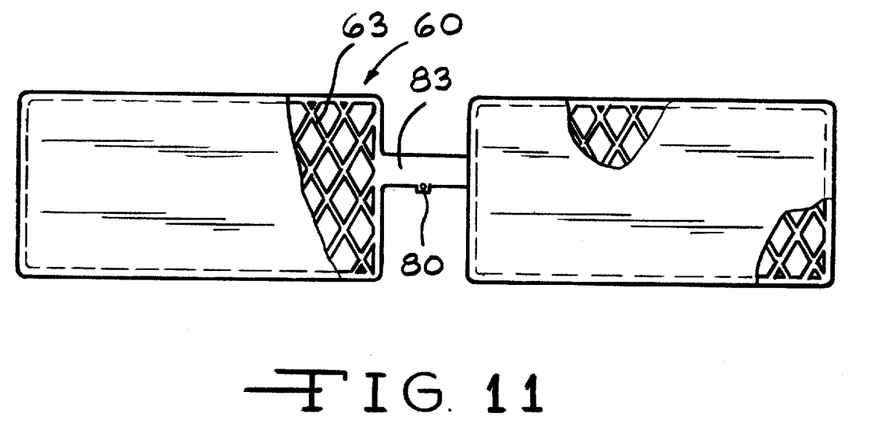
FIG. 11 is a top plan view of the sealed electrode assembly of the present invention with portions removed to illustrate the screen; and, FIG. 12 is a top plan view of the sealed electrode assembly of the present invention.
Figure 12:
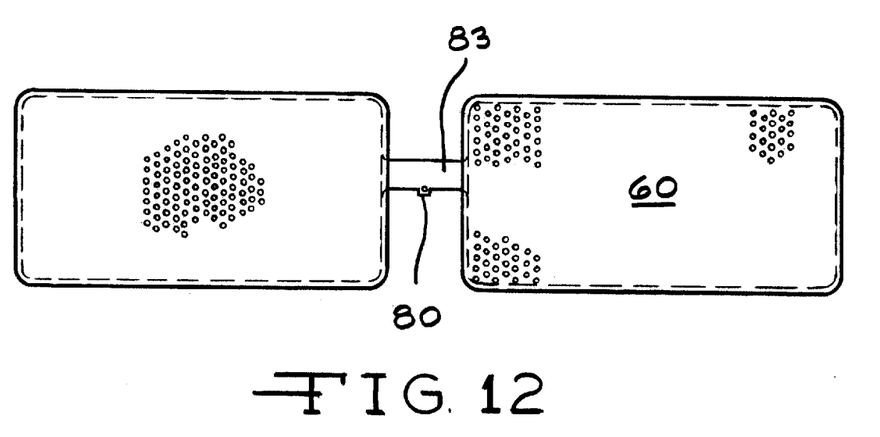

In FIGS. 11 and 12, the final sealed assembly is shown with the skeleton removed. A uniform seal that is free of stringers, air pockets, cracks or inconsistent seal widths is produced by the present invention. The combination of a precision machined heating element 98 and a precision molded pressure pad 52 provides consistent accuracy.

In operation, an individual sheet of separator material 20 is placed onto the heat seal fixture 40 such that the locating holes 150 on one end of the sheet are mounted onto the larger mounting pins 73. Next, the electrode assembly 60 with the screen 63 and the active material pressed onto it is placed on the heat seal fixture 40 and is positioned by the retractable pins 77 which are accessible through the opening 153 in the separator material 20. Next, the separator material 20 is folded over the electrode assembly 60 and the larger guiding pins 73 are inserted through the second set of locating holes 150 on the separator sheet.

With the electrode assembly 60 and the separator material 20 precisely positioned on the fixture 40, the sealing cycle is initiated. During the cycle, the temperature of the heating element 98 is controlled by the rheostat setting, and the pressure pad 52 is pressed against the fixture 40 at a pressure of approximately 80–100 psi for a predetermined time period. The cycle includes a dwell time, where the pressure is applied but the heat is removed. In order to safely remove the sealed electrode assembly from the fixture, the retractable locating pins 77 are retracted by the lever 86. As known to those of ordinary skill in the art, the variables of the rheostat setting, cycle time, pressure, and dwell time may be varied depending on the size and shape of the electrode assembly 60 and depending on the properties of the separator material.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A system for sealing individual sheets of separator material around an electrode, the system comprising:
    a computer controlled cutting system for cutting openings in the separator material;
    a heat sealing fixture having an upper platen comprising a molded resilient member mounted on a block, the resilient member having at least one cavity defined therein corresponding to the shape of the electrode, and a lower platen with a dielectric plate mounted on a block, the dielectric plate having a precision track defined therein, the precision track corresponding to the shape of the electrode, the lower platen having at least two first guide pins for locating the sheet of separator material and having at least two second guide pins for locating the electrode on the fixture;
    a heating element disposed inside the track and having a raised portion for cutting and a flat portion for sealing the sheet of separator material about the electrode; and,
    a press operatively associated with the heat sealing fixture such that the upper and lower platens are pressed together such that the upper platen acts as a pressure pad to cut and seal the separator material between the pressure pad and the heating element.

2. The system of claim 1, wherein the cutting system includes a laser cutting device.

3. The system of claim 1, wherein the cutting system includes a reel-to-reel conveyor system.

4. The system of claim 1, wherein the dielectric material in the lower platen is a machinable ceramic.

5. The system of claim 1, wherein the precision track terminates in an opening leading to a connecting terminal.

6. The system of claim 1, wherein the at least two second guide pins are retracted through an opening in the dielectric plate by a spring-biased piston connected to a lever.

7. The system of claim 1, wherein the raised portion of the heating element is discontinuous.

8. The system of claim 1, further comprising a pressure-sensitive adhesive tape disposed on the upper platen.

9. The system of claim 1, further comprising a pressure-sensitive adhesive disposed on the lower platen.

10. The system of claim 1, wherein the molded resilient member is constructed from silicone rubber.

11. A system for sealing individual sheets of separator material around an electrode, the system comprising:

a computer controlled laser cutting device for cutting openings in the separator material;

a heat sealing fixture having an upper platen comprising a molded resilient member mounted on a block, the resilient member having at least one cavity defined therein corresponding to the shape of the electrode, and a lower platen with a dielectric plate mounted on a block, the dielectric plate having a precision track defined therein, the precision track corresponding to the shape of the electrode, the lower platen having at least one fixed guide pin for locating the sheet of separator material and having at least one retractable guide pin for locating the electrode on the fixture, the retractable guide pin connected to a spring-biased piston capable of being operated by a lever such that the retractable guide pin is capable of being moved between a first position where it extends through the dielectric plate and a second position where it retracts below the surface of the dielectric plate by means of an opening in the dielectric plate;

a heating element disposed inside the track and having a raised portion for cutting and a flat portion for sealing the sheet of separator material about the electrode, the heating element extending downward through the dielectric plate to a connector terminal;

a power source connected to the connector terminal; and, a press operatively associated with the heat sealing fixture such that the upper and lower platens are pressed together such that the upper platen acts as a pressure pad to cut the separator material between the pressure pad and the raised portion of the heating element and to seal the separator material between the pressure pad and the flat portion of the heating element.

12. The system of claim 11, wherein the cutting system includes a reel-to-reel conveyor system.

13. The system of claim 11, wherein the dielectric material in the lower platen is a machinable ceramic.

14. The system of claim 11, wherein the raised portion of the heating element is discontinuous.

15. The system of claim 11, further comprising a pressure-sensitive adhesive tape disposed on the upper platen.

16. The system of claim 11, further comprising a pressure-sensitive adhesive disposed on the lower platen.

17. The system of claim 11, wherein the molded resilient member is constructed from silicone rubber.

18. A method of heat sealing a sheet of separator material around an electrode assembly, comprising:

cutting openings in the separator material with a computer controlled cutting system;

providing a heat sealing fixture having an upper platen comprising a molded resilient member mounted on a block, the resilient member having at least one cavity a defined therein corresponding to the shape of the electrode, and a lower platen with a dielectric plate mounted on a block, the dielectric plate having a precision track defined therein, the precision track corresponding to the shape of the electrode, the lower platen having at least two first guide pins for locating the sheet of separator material and having at least two second guide pins for locating the electrode on the fixture, a heating element disposed inside the track and having a raised portion for cutting and a flat portion for sealing the sheet of separator material about the electrode, and a press operatively associated with the heat sealing fixture such that the upper and lower platens are pressed together such that the upper platen acts as a pressure pad to cut and seal the separator material between the pressure pad and the heating element;

placing a sheet of separator material in the heat sealing fixture such that a first pair of holes in the separator material mates with the at least two first guiding pins on the lower platen;

placing the electrode assembly onto the sheet of separator material and positioning the electrode assembly by means of the at least two second guide pins on the lower platen;

folding the sheet of separator material over the electrode assembly and mating a second pair of holes in the separator sheet with the at least two first guide pins;

activating the heating element; and, closing the upper and lower platens with pressure to cut and seal the separator material between the resilient member on the upper platen and the heating element on the lower platen.

19. The method of claim 18, wherein the raised portion on the heating element is discontinuous.

20. The method of claim 18, wherein the dielectric plate is formed out of a machinable ceramic material.

* * * * *